(No Model.)
J. F. MORELL.
REPAIRING VEHICLE AXLES.
No. 376,900. Patented Jan. 24, 1888.
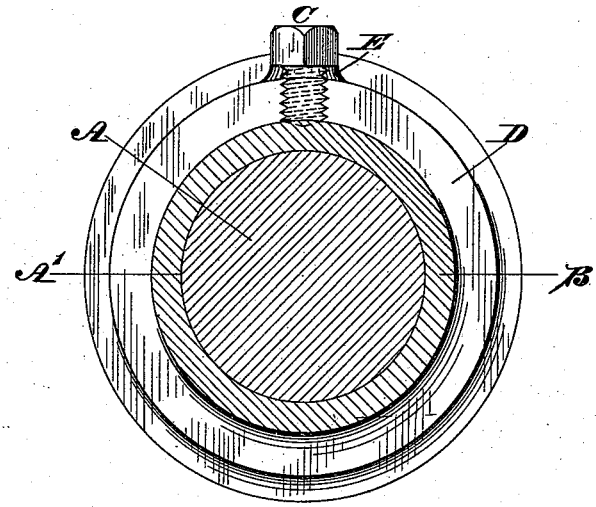
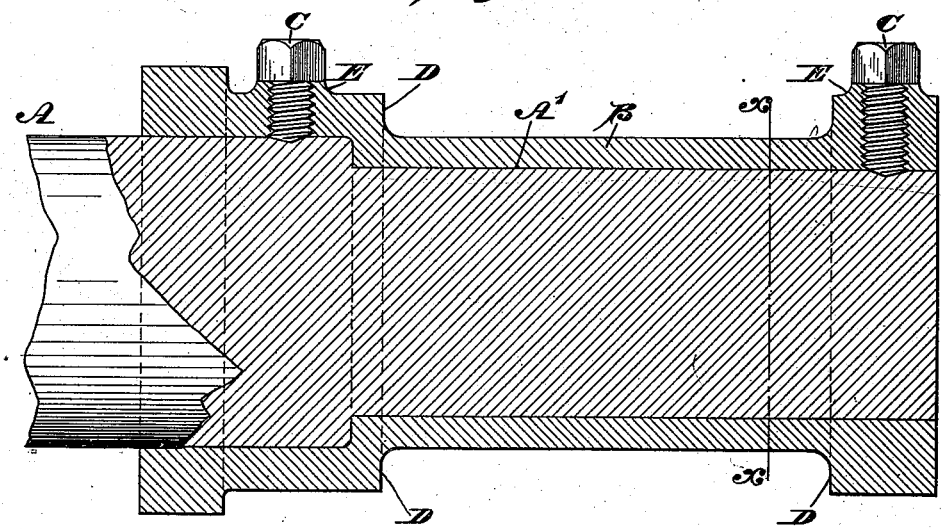

UNITED STATES PATENT OFFICE.

JAMES F. MORELL, OF CAMDEN, NEW JERSEY, ASSIGNOR OF ONE-HALF TO JOSEPH E. ROBERTS, OF SAME PLACE.

REPAIRING VEHICLE-AXLES.

SPECIFICATION forming part of Letters Patent No. 376,900, dated January 24, 1888.

Application filed July 21, 1887. Serial No. 244,862. (No model.)

*To all whom it may concern:*

Be it known that I, JAMES F. MORELL, a citizen of the United States, residing at Camden, county of Camden, State of New Jersey, have invented a new and useful Improvement in Restoring Reduced Journals and Axles, which improvement is fully set forth in the following specification and accompanying drawings.

My invention consists of means for restoring a reduced or worn-out journal or axle, whereby the latter may render further service, as will be hereinafter fully set forth.

Figure 1 represents a transverse section in line x x, Fig. 2, of a device for restoring a reduced journal or axle embodying my invention. Fig. 2 represents a longitudinal section thereof.

Similar letters of reference indicate corresponding parts in the two figures.

Referring to the drawings, A represents a journal or axle which has been reduced from wear, as at A', so as to be comparatively useless for its purposes.

B represents a sleeve whose inner diameter is less than that of the reduced portion A' of the journal or axle, and having set screws or bolts C, which pass through the wall of the sleeve, so as to tighten against said portion A'.

The outer surface of the sleeve is formed with shoulders D, and generally of the contour similar to those on the journal or axle as originally constructed.

In order to provide increased holding-surfaces for the screws or bolts C and strengthen the adjacent portions of the sleeve, bosses E are formed on the sleeve around the opening in which the screws or bolts are fitted, said bosses being internally threaded and coinciding with said openings.

The operation is as follows: When a journal or axle is so reduced from wear as to be comparatively useless, the sleeve B is slipped over the portion A' and the screws or bolts C are tightened, whereby the sleeve is firmly held in position, and the journal or axle may be said to be restored. The wheel, pulley, &c., formerly on the journal or axle may now be returned over the sleeve and run thereon as usual, it being seen that the reduced journal or axle, though comparatively useless for its original purpose, now renders continued service instead of being thrown aside as old metal.

The invention is also serviceable for increasing the diameter of a journal or axle when so required, or when harder metal is desirable for the surface of a journal or axle.

Having thus described my invention, what I claim as new, and desire to secure by Letters Patent, is—

1. A device for restoring a reduced journal or axle, consisting of a sleeve which is adapted to be fitted on the reduced portion of the journal or axle, and having a securing screw or bolt, the exterior of the sleeve being of a contour corresponding to that of a journal or axle, substantially as described.

2. A sleeve of the contour of a journal or axle, substantially as and for the purpose set forth.

3. A sleeve of the contour of a journal or axle and provided with a screw or bolt, substantially as and for the purpose set forth.

4. The sleeve B, substantially as described, provided with a screw or bolt, and a boss about the opening for said screw, as set forth.

JAMES F. MORELL.

Witnesses:
JOHN A. WIEDERSHEIM,
A. P. JENNINGS.